Jan. 9, 1968  G. E. ROWE  3,362,545

TAKE-OUT TONG MECHANISM FOR A GLASSWARE FORMING MACHINE

Filed Sept. 3, 1965  2 Sheets-Sheet 1

INVENTOR.
GEORGE E. ROWE
BY
McCormick, Paulding & Huber
ATTORNEYS

Jan. 9, 1968 G. E. ROWE 3,362,545
TAKE-OUT TONG MECHANISM FOR A GLASSWARE FORMING MACHINE
Filed Sept. 3, 1965 2 Sheets-Sheet 2

United States Patent Office 3,362,545
Patented Jan. 9, 1968

3,362,545
TAKE-OUT TONG MECHANISM FOR A
GLASSWARE FORMING MACHINE
George E. Rowe, Wethersfield, Conn., assignor to Emhart Corporation, Bloomfield, Conn., a corporation of Connecticut
Filed Sept. 3, 1965, Ser. No. 484,892
5 Claims. (Cl. 214—1)

ABSTRACT OF THE DISCLOSURE

A take-out apparatus for removing ware from a multi-gob glassware forming machine. The apparatus comprising a head movable horizontally and having a pair of tong arms pivotally suspended therefrom which have vertically and pivotally adjustable tongs at their bottom ends for engaging and transporting ware.

Figure 1:
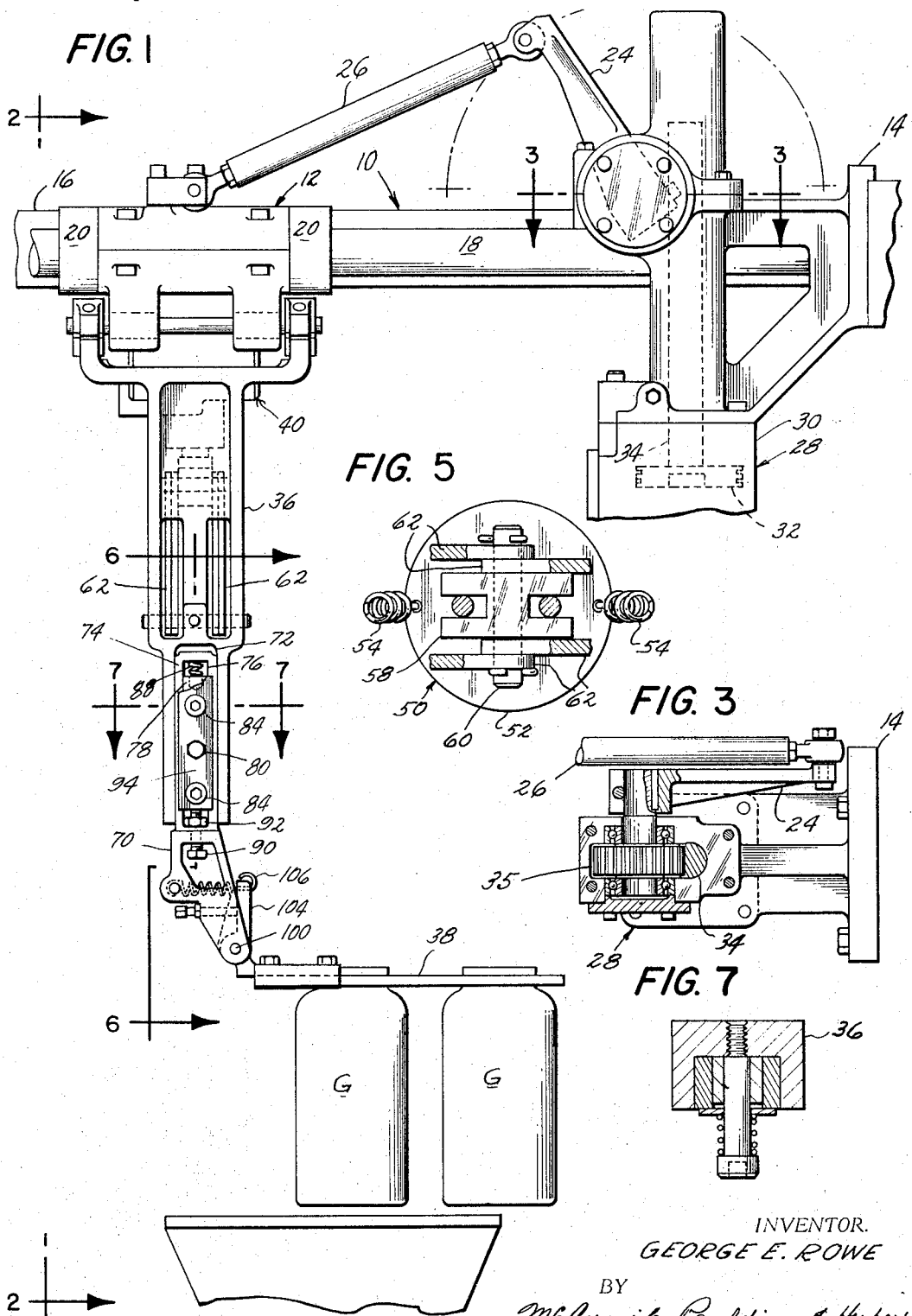

This invention relates to a tong mechanism for handling glassware articles and, more specifically, to a tong mechanism which is particularly adapted to take out finished articles of glassware from the mold of a glassware forming machine.

It is the general object of the invention to provide a tong mechanism capable of operation at high speed in the handling of glassware and which can be used to advantage in association with known single or multiple gob glassware forming machines, but which, by reason of the provision or adjustment for the tongs, can be used to particular advantage in association with multiple gob glassware forming machines.

In known glassware forming machines (as shown for example in U.S. Patent No. 1,911,119 and in my copending U.S. patent application, Ser. No. 110,461, filed May 16, 1961, now Pat. No. 3,223,511) there are separable or openable blank molds and finish molds and many other mechanisms operated in timed relationship to each other. Since the tong mechanism of this invention is to be associated with such a glassware forming machine, the tong mechanism is to be operated in timed relationship with the operation of the other mechanisms of the machine and in particular relationship to the opening and closing of the final shaping or finish molds of the machine. That is, a common control means is to be employed for the glassware forming machine and for the tong mechanism of this invention. This control mechanism may take various forms, but in the two forming machines mentioned above, such control mechanism comprises a timing drum having a plurality of valve actuators carried in spaced positions on its cylindrical periphery. Then, as the drum is rotated, valves controlling the operation of the various mechanisms of the forming machine will be operated in sequence by the control or timing drum actuators. The tong mechanism of this invention can be operated in timed relationship with the opening and closing of the machine molds by providing operating valves for it, the said valves being actuated by actuators carried on the control drum.

As will be described in greater detail hereinafter, the tong mechanism includes a horizontal support and a tong head which is reciprocated on said support in timed relationship to opening and closing of the molds. That is, means is provided for moving the tong head along the horizontal support between a position wherein the head is adjacent the forming machine mold and a position wherein it is remote from the mold. A pair of tong arms are pivotally supported on opposite sides of the tong head, and a motor carried by the tong head and which is operated in timed relationship with the opening and closing of the mold operates to spread the tong arms only when the head is in its remote position and to close the tong arms toward each other only when the head is adjacent the mold and the separable mold is open.

A pair of tongs are vertically adjustably supported at the bottom of the respective tong arms, and they are adapted to cooperate in gripping articles of glassware when the tong arms are closed. It is a feature of the construction that the tongs are angularly adjustable at the bottom of the tong arms as well as being vertically adjustable, this to assure that the tongs will properly grip the glassware, particularly in a multiple gob or multiple mold installation.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 2:
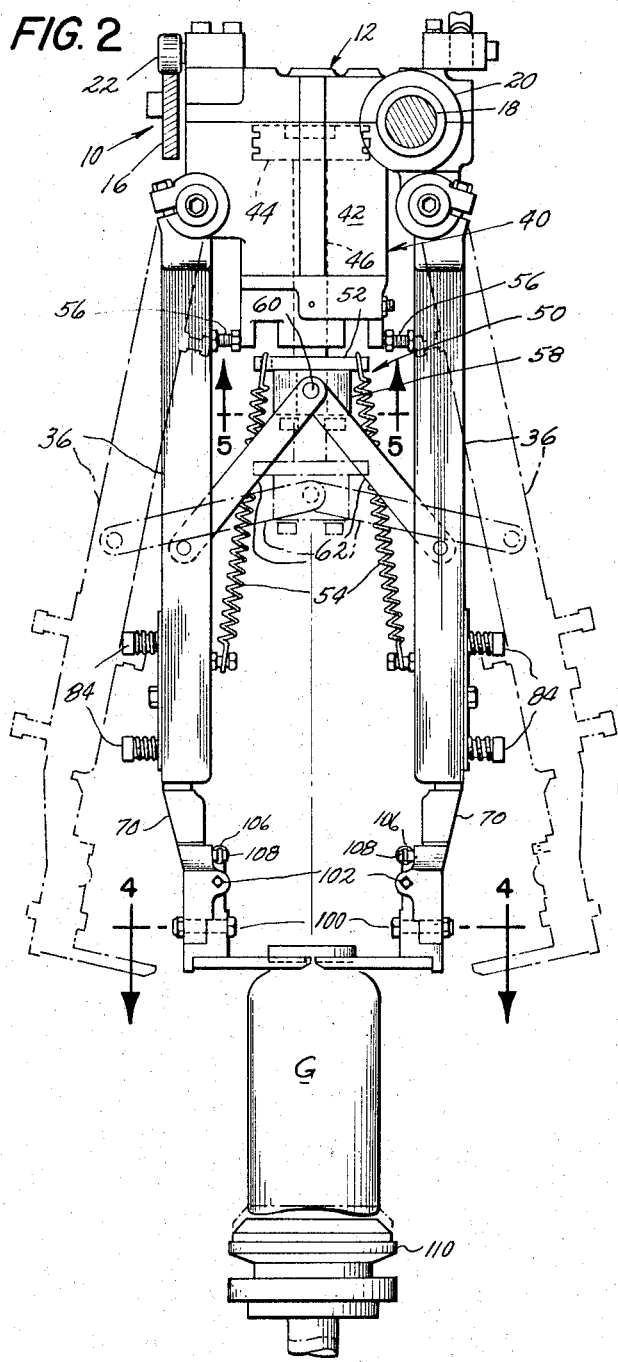
Figure 6:
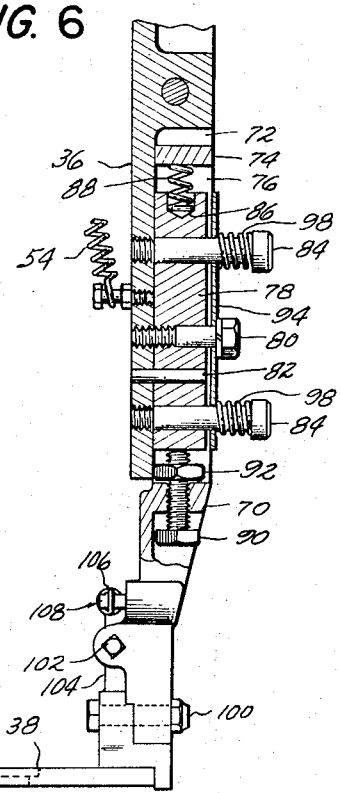
Figure 4:
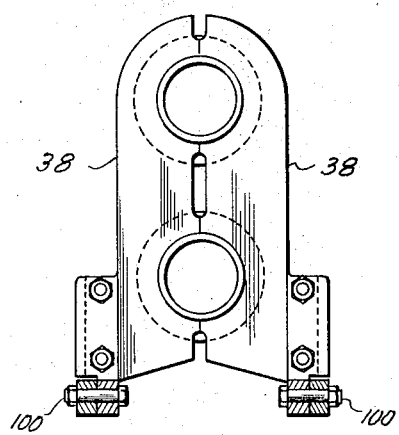

Of the drawings:
FIG. 1 is a side view of the tong mechanism provided in accordance with the present invention showing the tongs in movement and while supporting articles of glassware;
FIG. 2 is a front view of the tong mechanism taken as indicated by the line 2—2 of FIG. 1;
FIG. 3 is a horizontal cross sectional view taken as indicated by the line 3—3 of FIG. 1 to show details of the structure of the means which reciprocates the tong head;
FIG. 4 is a further horizontal cross sectional view providing a top plan view of the tong or jaw elements in closed position;
FIG. 5 is a horizontal sectional view taken as indicated by the line 5—5 of FIG. 2 showing the means used to operate the tong arm linkages;
FIG. 6 is a vertical cross sectional view taken through a portion of one of the tong arms as indicated by the line 6—6 of FIG. 1; and
FIG. 7 is a horizontal cross sectional view taken through the tong arm of FIG. 6 as indicated by the line 7—7 of FIG. 1;

As best shown in FIGS. 1 and 2, the tong mechanism includes a generally horizontal support 10 which accommodates sliding movement of a tong head structure indicated generally by the reference number 12. The horizontal support includes a frame 14 having an elongated rail 16 and an elongated rod 18 extending forwardly therefrom in parallel relationship. The tong head 12 has a cylindrical portion 20 embracing and slidable along the rod 18 and it carries a roller 22 which rides on the rail 16.

Thus, it will be seen that the tong head 12 moves along the horizontal support 10 like a saddle disposed between the rod 18 and the rail 16. The head is moved along the support between a position wherein it is as far right as it can go as viewed in FIG. 1 and a position to the far left. In the right-hand position of the tong head 12, it is closest to the forming machine mold or molds, and in the left-hand position it is most remote therefrom.

The means moving the tong head between the remote and adjacent positions relative to the mold includes a crank 24 (FIG. 1) which is rotatably supported by the frame 14 for movement through substantially a 180° arc which is shown by the broken line. The crank 24 is pivotally connected to the tong head 12 by an adjustable length link 26, and the crank is oscillated through its arc to reciprocate the said tong head by motor means indicated generally by the number 28.

The preferred form of motor means 28 comprises an air or hydraulic fluid cylinder 30 capable of driving a piston 32 in reverse vertical directions. The piston 32 is formed with an upwardly extending rod 34 formed as a rack having gear teeth therein. The rack teeth will mesh with a pinion 35 (FIG. 3) secured to the shaft of the crank 24 so as to oscillate the crank 24 as the piston 32 is reciprocated.

It will be readily understood that the fluid motor 28 can be operated by the control means for a glassware forming machine in timed relationship to the operation or opening and closing of the glassware forming molds by having said control means actuate a valve (not shown) which in turn controls the fluid motor 28 so that the piston 32 will be thrust upwardly to move the tong head 12 forwardly to its remote position and to thrust the piston 32 downwardly to move the tong head rearwardly to its mold position.

The tong mechanism also includes a pair of tong arms 36, 36 which are pivotally supported on the tong head 12 to depend therefrom at opposite sides thereof. These tong arms support a pair of tong elements or jaws 38, 38 at their lower ends as will be more fully described, the said tong elements being adapted to cooperate when closed to grip articles of glassware G, G. The tong arms are movable from a spread position which is shown in broken lines in FIG. 2 to a closed position shown in full lines therein. The arms are moved between the spread or open position and the closed position by a motor 40 carried by the head 12.

The preferred motor is driven by hydraulic fluid or air and comprises a cylinder 42 and a piston 44 having a downwardly extending rod 46. A tong arm actuating head 50 is carried on the bottom end of the piston rod 46, and this head includes an upper flange or disc 52 to which springs 54, 54 are connected and which extend to the arms 36, 36 and tend to bias the arms inwardly toward the closed position shown in full lines in FIG. 2. The limit of such inward movement of the arms is fixed by a pair of stops 56, 56 carried by the respective arms to engage the sides of the tong head 12.

The tong actuating head 50 also includes a depending bracket 58 (FIG. 5) which is secured to the disc 52 to mount a transversely extending pin or pintle 60. Linkages 62, 62 are connected in pairs adjacent the opposite ends of the pintle 60 and are pivotally connected to the arms 36, 36 so that as the piston 44 is thrust downwardly the arms are thrust outwardly into their spread position indicated by the broken lines in FIG. 2.

It will be seen that the fluid motor 40, like the previously mentioned fluid motor, can be controlled to operate in timed relationship with the operation of the forming machine mold. That is, the piston 44 can be thrust downwardly to open the tong arms and then upwardly to close the tong arms. In proper operation of the tong mechanism, the tong arms are opened only when the tong head 12 is in its remote position, and the tong arms are closed only when the tong head is adjacent the mold and the mold is open. Thus, the tong arms can be spread or open in a poised position to engage glassware when the forming machine mold is opened.

As was previously mentioned, it is a feature of the present invention to secure the tong elements or jaws 38, 38 to the tong arms 36, 36 so that they can be vertically adjusted relative thereto. To accomplish this, a bracket 70 is associated with each tong element 38 and each arm 36. More specifically, the lower end portion of each tong arm is provided with a vertically extending recess or groove 72, and the upper portion of each bracket 70 fits into the said groove for vertical adjustment therein. The said upper portion of the bracket is identified by the reference numeral 74 and it will be seen to have a generally rectangular opening 76. The opening 76 accommodates a rectangular block 78 which is secured in position within the groove 72 in the bracket arm 36 by a locking screw 80, a dowel pin 82 and two retaining screws 84, 84. A socket 86 is provided in the upper end of the block 78 to provide a seat for a relatively heavy coil spring 88 which bears upwardly against the upper end wall of the upper portion 74 of the bracket 70. An adjusting screw 90 extends from the lower portion of the bracket 70 and is threaded therein to abut against the bottom end of the block 78, and a lock nut 92 is placed on the adjusting screw 90 to lock it in adjusted position.

In locating the bracket 70 in vertically adjusted position relative to its associated tong arm 36, the locking screw 80 and the lock nut 92 are loosened so that the adjusting screw 90 can be turned to move the bracket 70 upwardly or downwardly relative to the block 78 and the arm 36. The bracket does not slide loosely with respect to the arm and block because of the frictional engagement of a cover plate 94 which is pressed against the bracket 70 and the arm 36 at the sides of its groove 72 by means of springs 98, 98 which surround the retaining screws 84 and are seated between the screw heads and the said cover plate. After vertical adjustment has been completed, the locking screw 80 is tightened and so is the lock nut 92 to retain the bracket in the adjusted vertical position.

It will be seen that the tong elements 38, 38 extend generally longitudinally rearwardly from their associated brackets 70, 70. Each such tong element is pivotally connected to its associated bracket 70 on a pin 100. The pins 100, 100 extend horizontally on substantially the same axis at the bottom ends of the respective brackets 70, 70. The tong elements 38, 38 can be angularly adjusted about the axis of the said pins by means of an adjusting screw 102. That is, the adjusting screw 102 is threaded into the lower end portion of the associated bracket 70 to project outwardly and to engage an arm 104 connected to the associated tong element 38. By turning the adjusting screw 102 outwardly toward the arm 104, the associated tong 38 is pivotally adjusted so that its free end moves downwardly. The arm 104 is biased into engagement with the end of the associated adjusting screw 102 by a spring 106 extending between the end of the arm and a pin 108 extending outwardly from the bracket.

This adjustment is done to angularly adjust the tongs 38, 38 relative to a plane surface upon which the glassware or other articles may stand, and the tongs can thus be adjusted parallel to that surface to insure that they will grip a plurality of articles simultaneously and at the same location on each article.

The provision of vertical adjustment and tilt or angular adjustment for the tongs is particularly desirable. That is, the tongs can be vertically and angularly adjusted after installation of the tong mechanism in association with a glassware forming machine. The vertical adjustment adjusts the tongs for the height of a bottom plate 110 associated with a mold in a glassware forming machine. This bottom plate is shown in FIG. 2 and it is to be understood that it closes the bottom end of the two separable halves of a mold. When the mold halves are opened, the article of glassware G, rests upon the bottom plate until it is engaged by the tongs. The vertical adjustment of the tongs permits adjustment for different height articles of glassware. After the tongs have engaged the article of glassware, the forming machine operates to drop the bottom plate from the broken line position to the full line position shown in FIG. 2 so that the glassware article or articles can be moved forwardly by the tong mechanisms.

In a multiple gob machine, the tong mechanism is to be adapted to handle or grip a plurality of glassware articles. The tongs 38, 38 shown in FIG. 4 and in FIG. 1 are adapted to engage two such articles as would be the case with a double gob machine.

In a double or other multiple gob machine, the glassware forming mold has a plurality of cavities closed at the bottom by a bottom plate 110, the cavities being formed so that the articles of glassware will be shaped on side-by-side vertical axes which fall in a common plane. In such construction, the tongs 38, 38 are constructed and arranged to engage all articles of glassware in the mold simultaneously when the mold halves are opened.

That is, the mold arms 36, 36 swing inwardly from the sides of the mold from their spread position toward their closed position. In the closed position of the tongs 38, 38, they meet or substantially meet in the common vertical plane containing the axes of the articles of glassware.

The tilt or angular adjustment for the tong elements 38, 38 takes place in said vertical plane and helps assure that the tong elements will properly engage a plurality of the articles of glassware in a multiple-gob machine. This rather fine adjustment of the tong structures is particularly desirable in installations wherein short-necked articles of glassware are being made and wherein the glassware articles must be gripped at the neck by the tongs.

The invention claimed is:

1. A tong mechanism for engaging a plurality of articles standing side-by-side with their vertical center lines falling substantially in a common plane, a tong support, a tong head on said support, a pair of tong arms pivotally supported in cooperating depending relationship from the head on opposite sides of said plane and carrying a pair of tongs at their bottom end, each tong arm being pivotable on its side of the said plane toward and away from the said plane, the said pair of tongs being adapted to cooperate to grip simultaneously all of the said articles when the tong arms are pivoted from a spread or open position toward each other and toward the said plane to a closed position, and said tongs being individually vertically adjustable relative to the tong arms and being also individually pivotally adjustable on an axis normal to said plane to insure that the planes of the tongs coincide when gripping the articles.

2. A tong mechanism for engaging a plurality of articles standing side-by-side with their vertical center lines falling substantially in a common plane, a tong support, a tong head on said support, a pair of tong arms pivotally supported in cooperating depending relationship from the head on opposite sides of said plane and carrying a pair of tongs at their bottom end which extend in the same direction parallel to said plane and which cooperate to grip simultaneously all of the articles when the tong arms are pivoted from a spread or open position toward each other and toward the said plane to a closed position, each tong arm being pivotable on its side of the said plane toward and away from the said plane, and said tongs being individually vertically adjustable at the bottom of their respective tong arms and being also individually pivotally adjustable on an axis at the bottom of their respective arms which is normal to said plane to insure that the planes of the tongs coincide when gripping the articles.

3. A tong mechanism for removing ware from a separable mold in a glassware forming machine, said mechanism comprising a generally horizontal support, a tong head movable longitudinally on said support between a remote position forwardly of the mold and a position adjacent the mold, means for moving the head between said positions in timed relationship to the opening and closing of the mold, a pair of tong arms pivotally supported in cooperating depending relationship on opposite sides of the head, a bracket vertically adjustably secured at the lower end of each arm, a generally longitudinally extending tong secured to each bracket for pivotal adjustment on a transverse horizontal axis, the pair of tongs being pivotally adjustable on substantially the same axis and cooperating to grip ware when the arms are pivoted from a spread or open position toward each other to a closed position, and a motor on said head connected with said tong arms and operable to close them only when the head is in its mold position and the mold is open and to open them only when the head is in its remote position.

4. A tong mechanism for removing ware from a multiple gob glassware forming machine having a separable multiple mold forming ware on generally vertical side-by-side axes falling in a common plane, said mechanism comprising a generally horizontal support extending forwardly from said mold substantially parallel to said plane, a tong head movable along said support between a forward or remote position and a rearward position adjacent the mold, means for moving the head between said positions in timed relationship to the opening and closing of the mold, a pair of tong arms pivotally supported in cooperating depending relationship from the head on opposite sides of the said plane and carrying a pair of rearwardly extending tongs at their bottom end which cooperate to grip ware when the tong arms are pivoted from a spread or open position toward said plane to a closed position, said tongs being individually vertically adjustable at the bottom end of the tong arms and being also individually angularly adjustable on substantially the same horizontal axis extending transversely to said plane at the front end of said tongs, and a motor on said head connected with said tong arms and operable to close them only when the head is in its rearward position and the mold is separated and to open them only when the head is in its remote or forward position.

5. A tong mechanism as set forth in claim 4 wherein a bracket is vertically adjustably secured at the lower end of each arm and an associated tong is secured to the bracket to extend rearwardly therefrom and is pivotally adjustable relative to the bracket on the said transverse horizontal axis.

References Cited

UNITED STATES PATENTS

| | | | |
|---|---|---|---|
| 1,561,451 | 11/1925 | Lynch | 65—260 |
| 1,575,185 | 3/1926 | Stenhouse | 214—1 |
| 1,771,621 | 7/1930 | Fowler | 51—100 |
| 1,858,642 | 5/1932 | Ross | 65—260 XR |
| 1,979,763 | 11/1934 | Olson | 214—1 |
| 2,011,187 | 8/1935 | Rowe | 65—237 |
| 2,022,786 | 12/1935 | Schwab | 214—1 |
| 2,072,502 | 3/1937 | Haub | 198—20 |
| 2,497,600 | 2/1950 | Grigsby | 294—116 |

FOREIGN PATENTS 231,157  3/1962  Germany.

GERALD M. FORLENZA, *Primary Examiner.*

MARVIN A. CHAMPION, *Examiner.*